United States Patent
Shibata et al.

(10) Patent No.: US 11,071,029 B2
(45) Date of Patent: Jul. 20, 2021

(54) COMMUNICATION DEVICE, NON-TRANSITORY COMPUTER-READABLE RECORDING MEDIUM STORING COMPUTER-READABLE INSTRUCTIONS FOR TERMINAL DEVICE, AND METHOD PERFORMED BY COMMUNICATION DEVICE

(71) Applicant: Brother Kogyo Kabushiki Kaisha, Nagoya (JP)

(72) Inventors: Takeshi Shibata, Nagoya (JP); Hirotaka Asakura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/139,214

(22) Filed: Sep. 24, 2018

(65) Prior Publication Data
US 2019/0104454 A1    Apr. 4, 2019

(30) Foreign Application Priority Data

Sep. 29, 2017 (JP) .............................. JP2017-190526

(51) Int. Cl.
*H04W 36/02* (2009.01)
*H04W 48/16* (2009.01)
(Continued)

(52) U.S. Cl.
CPC ........... *H04W 36/023* (2013.01); *H04W 4/70* (2018.02); *H04W 4/80* (2018.02); *H04W 8/005* (2013.01);
(Continued)

(58) Field of Classification Search
CPC ... H04W 84/20; H04W 36/023; H04W 48/16; H04W 4/70; H04W 4/80; H04W 76/14;
(Continued)

(56) References Cited

U.S. PATENT DOCUMENTS 9,832,327 B2    11/2017  Asakura
10,149,346 B2 *  12/2018  He .......................... H04W 76/16
(Continued)

FOREIGN PATENT DOCUMENTS

EP        2914047 A1       9/2015
JP     2012-129898 A       7/2012
(Continued)

OTHER PUBLICATIONS

Feb. 28, 2019—(EP) Extended Search Report—App 18196650.8.
(Continued)

*Primary Examiner* — Huy D Vu
*Assistant Examiner* — Bao G Nguyen
(74) *Attorney, Agent, or Firm* — Banner & Witcoff, Ltd.

(57) ABSTRACT

A communication device may establish a second wireless connection with an external device in a case where a first wireless connection is established with the external device, determine whether a predetermined signal is received from the external device, and determine a preservation time according to the determination. The preservation time may be a time for preserving a state of the communication device in a parent station state after the second wireless connection has been disconnected. In a case where it is determined that the predetermined signal is received, one of a first preservation time and a second preservation time which is longer than the first preservation time may be determined as the preservation time, and in a case where it is determined that the predetermined signal is not received, the other of the first preservation time and the second preservation time may be determined as the preservation time.

11 Claims, 5 Drawing Sheets

(51) Int. Cl.
*H04W 4/80* (2018.01)
*H04W 76/16* (2018.01)
*H04W 8/00* (2009.01)
*H04W 76/19* (2018.01)
*H04W 4/70* (2018.01)
*H04W 76/30* (2018.01)
*H04W 76/14* (2018.01)
*H04W 84/12* (2009.01)
*H04W 88/04* (2009.01)

(52) U.S. Cl.
CPC .......... *H04W 48/16* (2013.01); *H04W 76/14* (2018.02); *H04W 76/16* (2018.02); *H04W 76/19* (2018.02); *H04W 76/30* (2018.02); *H04W 84/12* (2013.01); *H04W 88/04* (2013.01)

(58) Field of Classification Search
CPC ..... H04W 76/16; H04W 76/19; H04W 76/30; H04W 84/12; H04W 88/04; H04W 8/005
See application file for complete search history.

(56) References Cited

U.S. PATENT DOCUMENTS

| | | | |
|---|---|---|---|
| 2012/0215874 A1* | 8/2012 | Sequeira | H04L 41/0889 709/208 |
| 2012/0322498 A1 | 12/2012 | Nogawa | |
| 2013/0260818 A1 | 10/2013 | Suzuki et al. | |
| 2014/0342765 A1 | 11/2014 | Nogawa | |
| 2016/0080591 A1* | 3/2016 | Asakura | G06F 3/12 358/1.15 |
| 2016/0286344 A1 | 9/2016 | Terashita | |
| 2016/0316511 A1 | 10/2016 | Suzuki et al. | |
| 2017/0085725 A1* | 3/2017 | Cho | H04N 1/00244 |
| 2018/0124654 A1 | 5/2018 | Kim et al. | |
| 2019/0104454 A1* | 4/2019 | Shibata | H04W 48/16 |

FOREIGN PATENT DOCUMENTS

| | | |
|---|---|---|
| JP | 2013-005188 A | 1/2013 |
| JP | 2013-214803 A | 10/2013 |
| JP | 2016-058933 A | 4/2016 |
| WO | 2016/167618 A1 | 10/2016 |

OTHER PUBLICATIONS

"Wi-Fi Display Technical Specification version 1.1", Apr. 24, 2014 (Apr. 24, 2014), pp. 1-149, XP055238797, Retrieved from the Internet <URL:https://www.wi-fi.org/discover-wi-fi/specifications> [retrieved on Jan. 5, 2016].
Wi-Fi Alliance, "Wi-Fi Peer-to-Peer P2P Technical Specification", Version 1.5, pp. 1-183, 2014.
Aug. 24, 2020—(EP) Office Action—App 18196650.8.
Jan. 26, 2021—(JP) Notification of Reason for Rejection—App 2017-190526, Eng Tran.

* cited by examiner

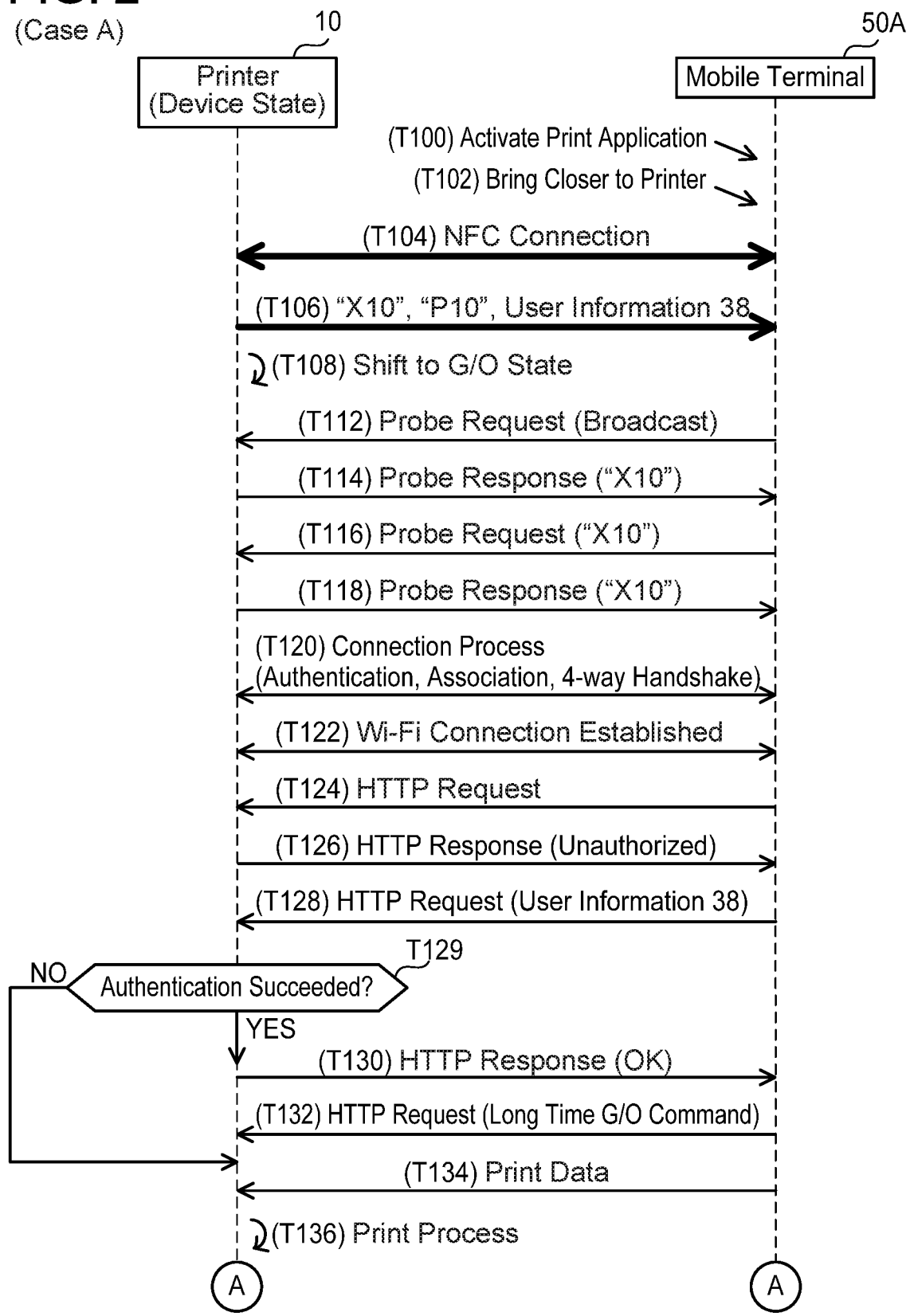

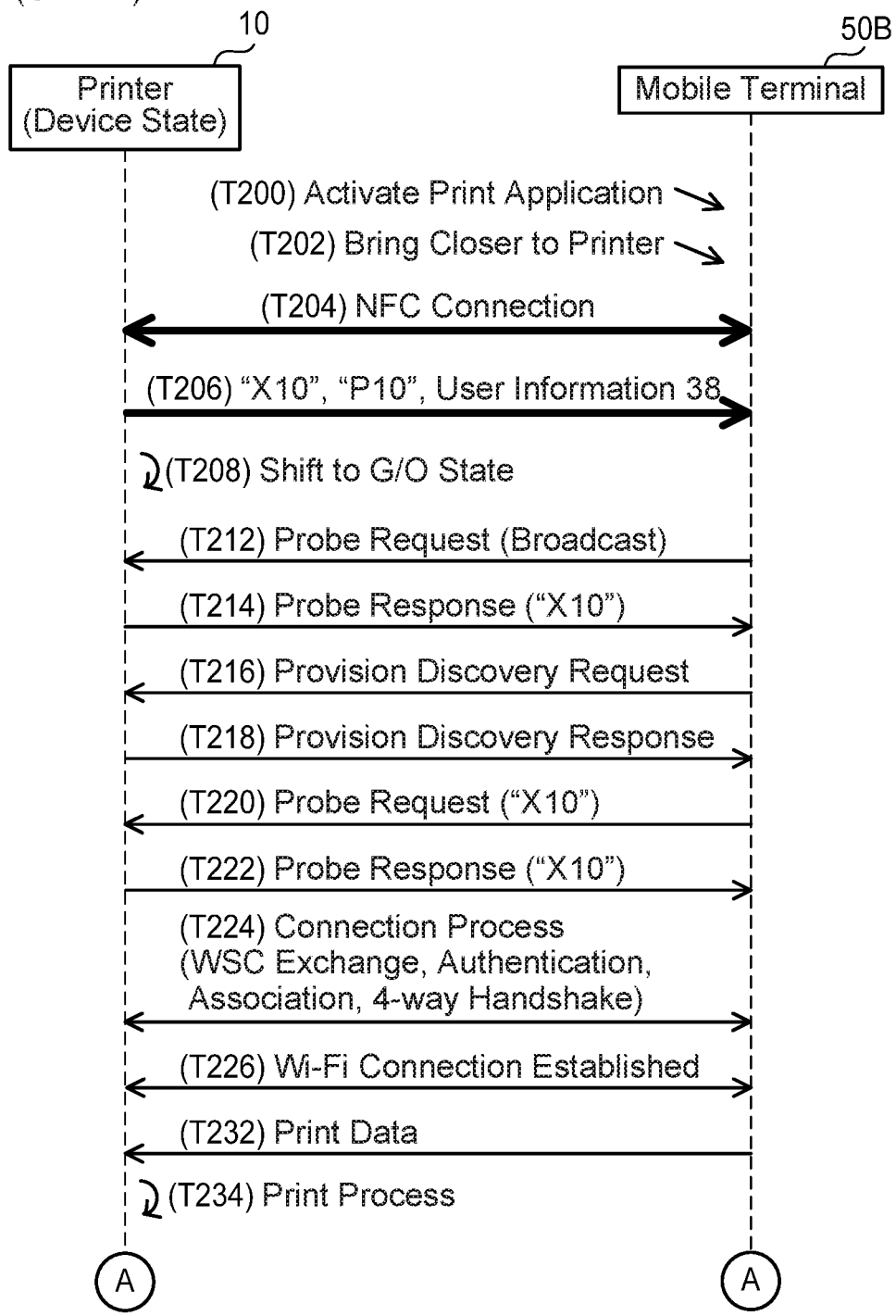

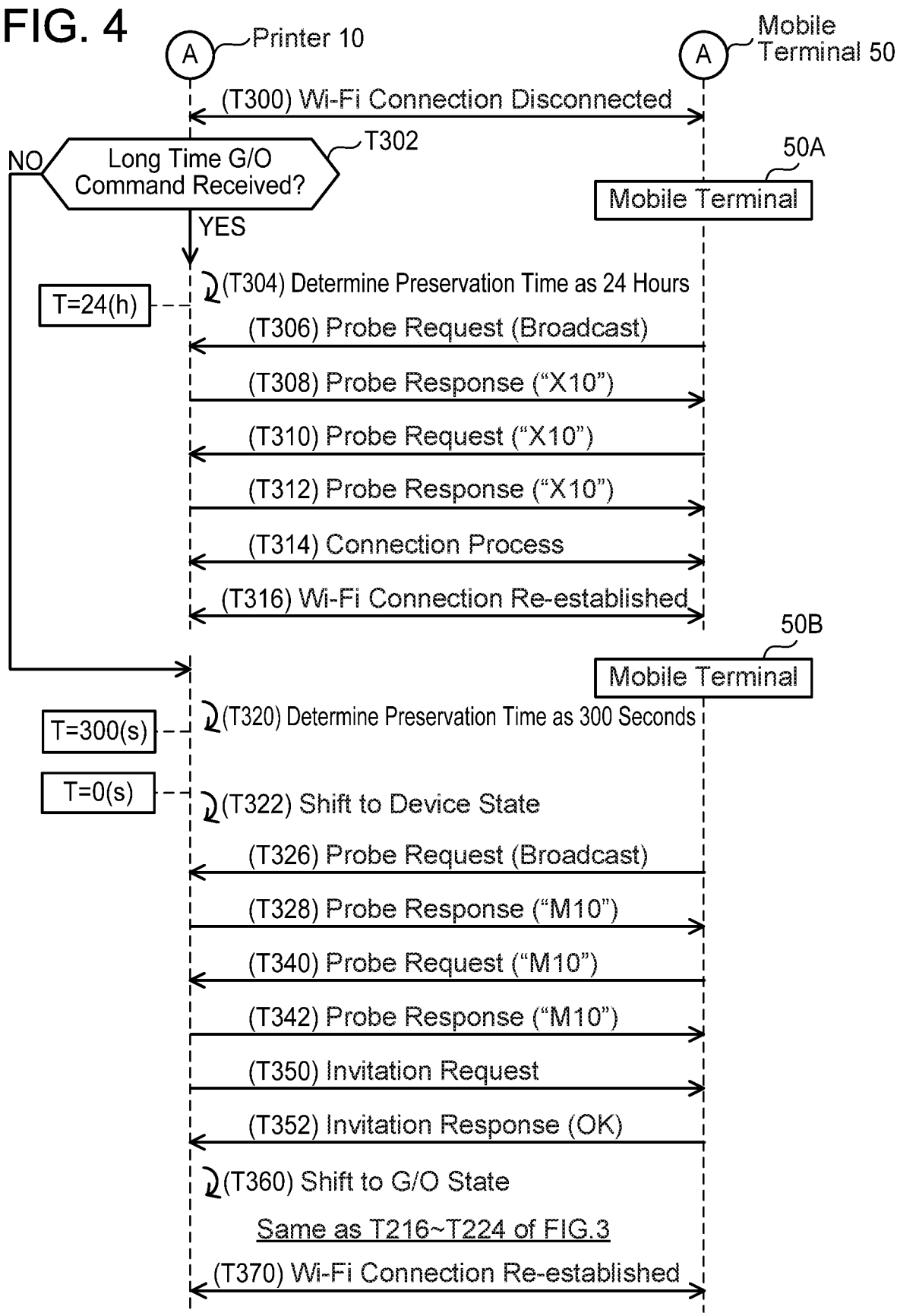

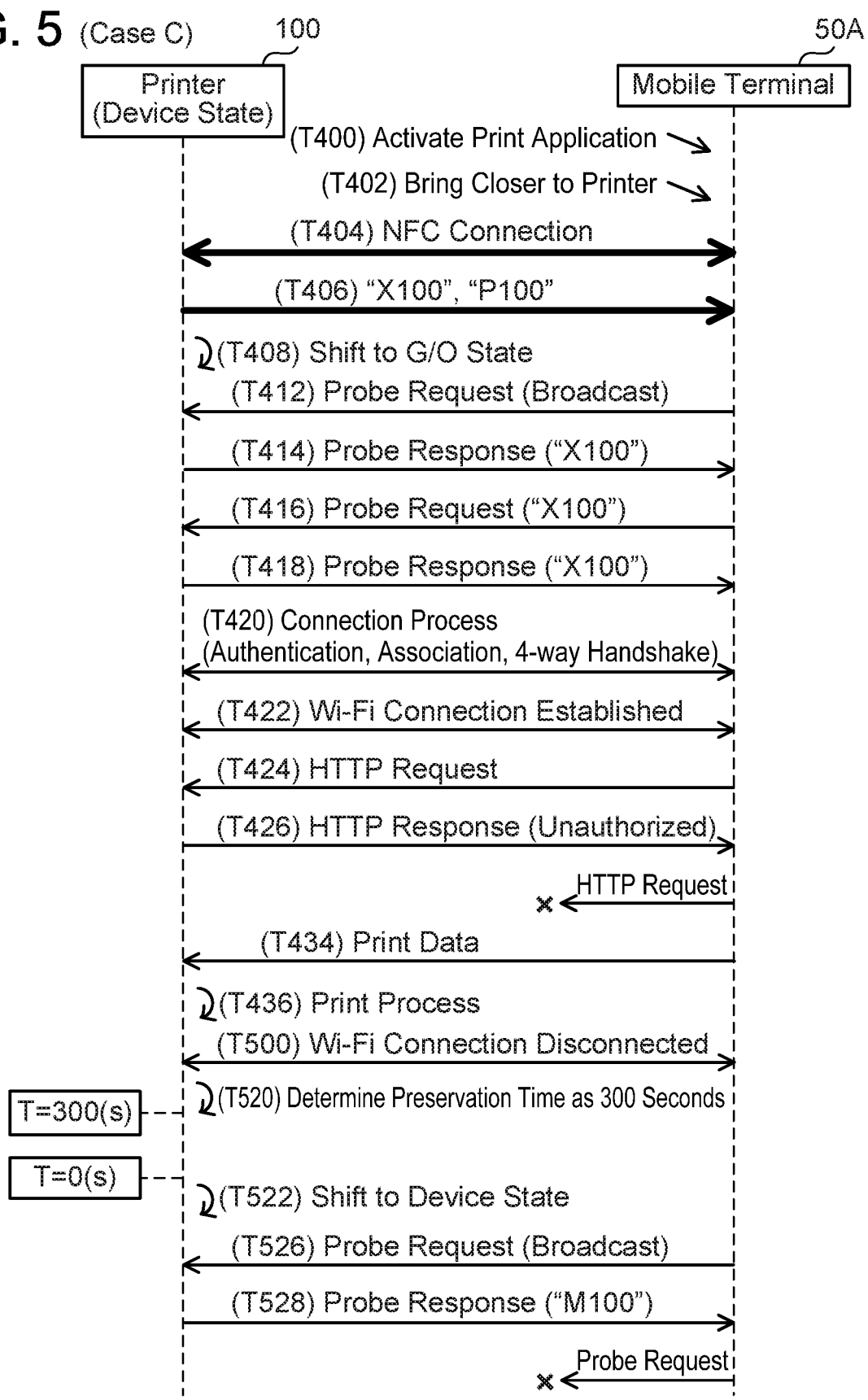
FIG. 5 (Case C)

COMMUNICATION DEVICE, NON-TRANSITORY COMPUTER-READABLE RECORDING MEDIUM STORING COMPUTER-READABLE INSTRUCTIONS FOR TERMINAL DEVICE, AND METHOD PERFORMED BY COMMUNICATION DEVICE

TECHNICAL FIELD

A disclosure herein discloses a technique that enables a communication device to establish a wireless connection with an external device.

BACKGROUND ART

A technique is known by which a wireless connection according to a Wi-Fi scheme is established between a pair of communication devices in response to executing a short-range wireless communication, such as an NFC (abbreviation of Near Field Communication) communication.

Further, it is also known that a so-called Persistent function is supported by, for example, a Wi-Fi Direct (registered trademark) scheme formulated by Wi-Fi Alliance. The Persistent function is a function that stores, in a case where an external device establishes a wireless connection with a communication device according to the WFD scheme, wireless information for establishing the wireless connection and enables, after the wireless connection has been disconnected, a wireless connection to be re-established with the communication device by using the stored wireless information.

SUMMARY

The disclosure herein discloses a communication device that is capable of executing an operation according to a type of an external device (e.g., according to presence or absence of the Persistent function).

A communication device disclosed herein may comprise: a first wireless interface; a second wireless interface, a maximum distance with which a wireless communication via the second wireless interface can be executed being larger than a maximum distance with which a wireless communication via the first wireless interface can be executed; a processor; and a memory storing computer-readable instructions therein, the computer-readable instructions, when executed by the processor, causing the communication device to: in a case where a first wireless connection via the first wireless interface is established with an external device, establish a second wireless connection via the second wireless interface with the external device so as to cause the external device to participate in, as a child station, a wireless network in which the communication device operates as a parent station; determine whether a predetermined signal is received from the external device, in a case where the second wireless connection is established with the external device, wherein in a case where the external device is a first type external device, the predetermined signal may be received from the first type external device, and in a case where the external device is a second type external device different from the first type external device, the predetermined signal may not be received from the second type external device; determine a preservation time according to the determination whether the predetermined signal is received, the preservation time being a time for preserving a state of the communication device in a parent station state under a situation where there is no child station device operating as a child station of the wireless network after the second wireless connection with the external device has been disconnected, the parent station state being a state where the communication device operates as the parent station of the wireless network; and in a case where the determined preservation time has elapsed without a child station device participating in the wireless network, shift the state of the communication device from the parent station state to a specific state where the communication device does not operate as a parent station or a child station of a wireless network, wherein one of a first preservation time and a second preservation time which is longer than the first preservation time may be determined as the preservation time, in a case where it is determined that the predetermined signal is received from the external device, and the other of the first preservation time and the second preservation time may be determined as the preservation time, in a case where it is determined that the predetermined signal is not received from the external device.

The disclosure herein further discloses a non-transitory computer-readable recording medium storing computer-readable instructions for a terminal device, wherein the computer-readable instructions, when executed by a processor of the terminal device, cause the terminal device to: in a case where a first wireless connection via a first wireless interface of the terminal device is established with a communication device, establish a second wireless connection via a second wireless interface of the terminal device with the communication device so as to participate in, as a child station, a wireless network in which the communication device operates as a parent station, a maximum distance with which a wireless communication via the second wireless interface can be executed being larger than a maximum distance with which a wireless communication via the first wireless interface can be executed; and in a case where the second wireless connection is established with the communication device, send a predetermined signal to the communication device via the second wireless interface by using the second wireless connection, wherein the predetermined signal may be a signal for instructing the communication device to use, as a preservation time of the communication device, a second preservation time from among a first preservation time and the second preservation time which is longer than the first preservation time, and the preservation time may be a time fur preserving a state of the communication device in a parent station state under a situation where there is no child station device operating as a child station of the wireless network after the second wireless connection with the terminal device has been disconnected, the parent station state being a state where the communication device operates as the parent station of the wireless network.

A control method, computer-readable instructions, and a non-transitory computer-readable recording medium storing the computer-readable instructions for realizing the aforementioned communication device are also novel and useful. The aforementioned terminal device itself and a control method of the terminal device are also novel and useful. Further, a communication system which comprises the aforementioned communication device and external device or terminal device) is also novel and useful.

BRIEF DESCRIPTION OF THE DRAWINGS

FIG. 2 shows a sequence diagram of a case A in which a connection between a mobile terminal 50A and a printer 10 is established;

FIG. 3 shows a sequence diagram of a case B in which a Wi-Fi connection between a mobile terminal 50B and the printer 10 is established;

FIG. 4 shows a sequence diagram continued from FIG. 2 and FIG. 3; and

FIG. 5 shows a sequence diagram of a case C in which a Wi-Fi connection between the mobile terminal 50A and a printer 100 is established.

EMBODIMENTS (Configuration of Communication System 2)

Figure 1:
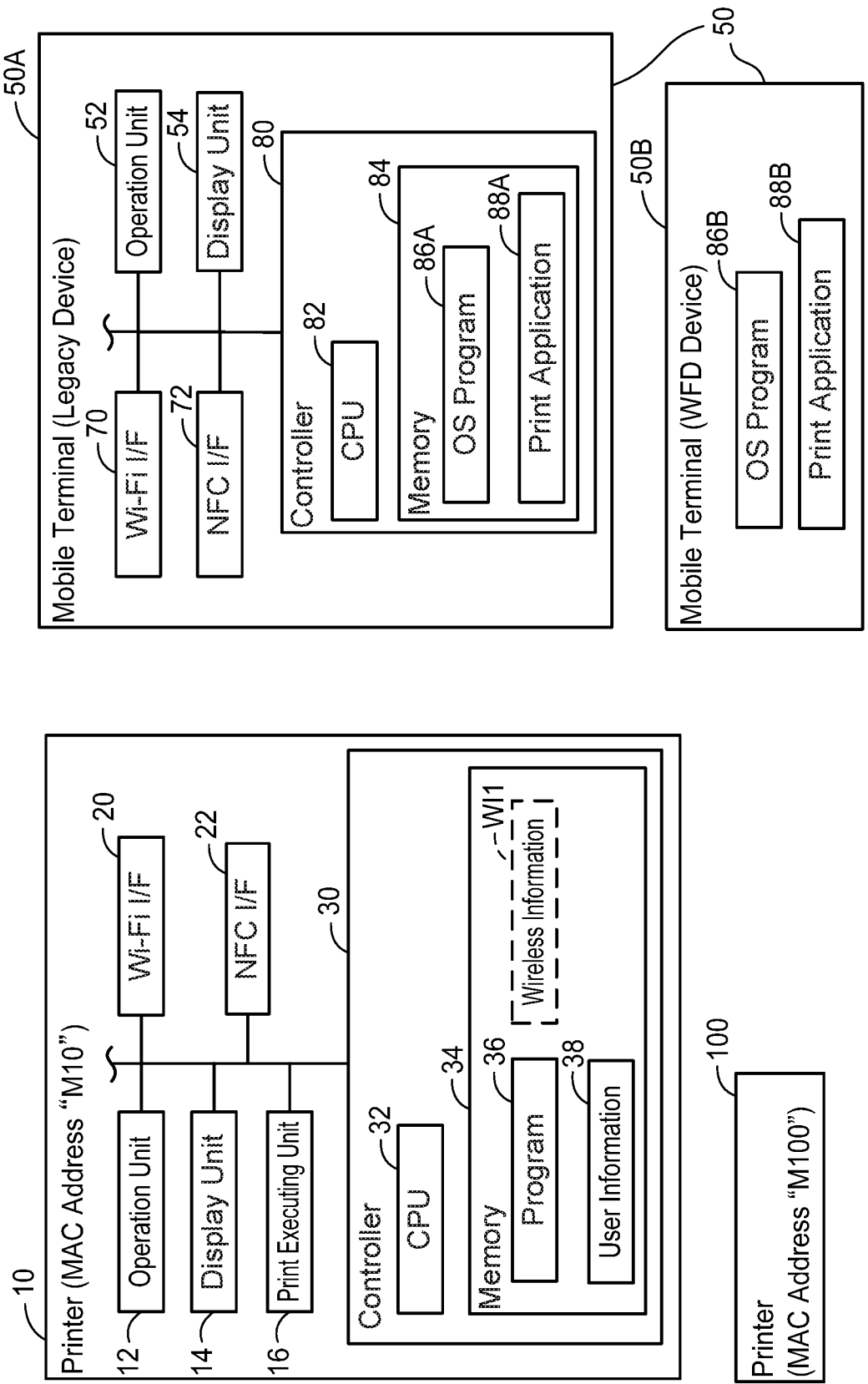
FIG. 1 shows a configuration of a communication system.

As shown in FIG 1, a communication system 2 comprises a printer 10, a printer 100, and mobile terminals 50 (i.e., 50A and 50B). The printer 10 is capable of establishing a wireless connection with each of the mobile terminals 50, and forming a wireless network to which the printer 10 and one of the mobile terminals 50 belong and a wireless network to which the printer 10 and the other of the mobile terminals 50 belong. Similarly, the printer 100 is also capable of forming a wireless network to which the printer 100 and one of the mobile terminals 50 belong, and a wireless network to which the printer 100 and the other of the mobile terminals 50 belong. It should be noted that a network may be termed "NW" hereinafter.

(Configuration of Printer 10)

The printer 10 is a peripheral device a peripheral device of the mobile terminals 50) capable of executing a print function, and includes a MAC address "M10". The printer 10 comprises an operation unit 12, a display unit 14, a print executing unit 16, a Wi-Fi interface 20 (an interface will be termed "I/F" hereinafter), an NFC I/F 22, and a controller 30.

The operation unit 12 includes a plurality of keys. A user can input various instructions to the printer 10 by operating the operation unit 12. The display unit 14 is a display for displaying various types of information. The display unit 14 functions as a so-called touch panel (i.e., as an operation unit). The print executing unit 16 includes a printing mechanism of an inkjet scheme, a laser scheme, or the like.

The Wi-Fi I/F 20 is an I/F for executing a Wi-Fi communication which is a wireless communication according to a Wi-Fi scheme. The Wi-Fi scheme is a wireless communication scheme based on, for example, IEEE (abbreviation of The institute of Electrical and Electronics Engineers Inc.) standard 802.11 and standards conforming thereto (e.g., 802.11a, 11b, 11g, 11n, etc.). The Wi-Fi I/F 20 especially supports a WFD (abbreviation of Wi-Fi Direct (registered trademark)) scheme formulated by Wi-Fi Affiance. The WFD scheme is a wireless communication scheme described in the standard document "Wi-Fi Peer-to-Peer (P2P) Technical Specification Version 1.5" created by the Wi-Fi Alliance.

The printer 10 can operate in any of a G/O (abbreviation of Group Owner) state, a CL (abbreviation of Client) state, and a device state according to the WFD scheme. In a case where the printer 10 operates in the G/O state, the printer 10 can form a WFDNW in which the printer 10 operates as a parent station (i.e., as a G/O) and an external device operates as a child station. Further, in a case where an external device operates in the G/O state, the printer 10 operates in the CL state and can participate in, as a child station (i.e., as a CL), a WFDNW formed by the external device. The device state is a state neither of the G/O state nor the CL state, that is, a state where the printer 10 is not establishing a wireless connection with an external device.

In particular, the printer 10 can form a WFDNW as described below in the case of operating in the G/O state of the WFD scheme. For example, in a case where an external device supports the WFD scheme, the printer 10 can cause the external device to participate in the WFDNW as a CL of the WFD scheme by executing a connection process according to the WFD scheme and establishing a wireless connection according to the WFD scheme. Meanwhile, for example, in a case where the external device does not support the WFD scheme (i.e., in a case where the external device is a so-called legacy device), the printer 10 can cause the external device to participate in the WFDNW as a legacy, which is not the CL state of the WFD scheme, by executing a connection process according to a normal Wi-Fi scheme which is not the WFD scheme and establishing a wireless connection according to the normal Wi-Fi scheme. Hereinafter, the wireless connection according to the normal Wi-Fi scheme and the wireless connection according to the WFD scheme will be termed "normal Wi-Fi connection" and "WFD connection", respectively. Further, "normal Wi-Fi connection" and "WFD connection" may be collectively termed "Wi-Fi connection".

The NFC I/F 22 is an I/F for executing an NFC communication according to an NFC scheme. The NFC scheme is a wireless communication scheme based on international standards such as ISO/IEC14443, 15693, and 18092. Hereinafter, a wireless connection according to the NFC scheme will be termed "NFC connection".

Here, differences between the Wi-Fi I/F 20 and the NFC I/F 22 are described. A communication speed of a Wi-Fi communication via the Wi-Fi I/F 20 (e.g., maximum communication speed is 11 to 600 Mbps) is faster than a communication speed of an NFC communication via the NFC I/F 22 (e.g., maximum communication speed is 100 to 424 Kbps). Further, a frequency of a carrier wave in a Wi-Fi communication via the Wi-Fi I/F 20 (e.g., 2.4 GHz band or 5.0 GHz band) is different from a frequency of a carrier wave in an NFC communication via the NFC I/F 22 (e.g., 13.56 MHz band). Further, a maximum distance with which a Wi-Fi communication via the Wi-Fi I/F 20 can be executed (e.g., about 100 m at maximum) is larger than a maximum distance with which an NFC communication via the NFC I/F 22 can be executed (e.g., about 10 cm at maximum).

The controller 30 comprises a CPU 32 and a memory 34. The CPU 32 executes various processes according to a program 36 stored in the memory 34. The memory 34 is constituted of a volatile memory, a non-volatile memory, and the like. Further, the memory 34 stores user information 38. The user information 38 is information for a user authentication, and includes a user name and an authentication password. Further, the memory 34 can store wireless information WI1. The wireless information includes an WI1 includes an SSID and a password for a WFDNW in which the printer 10 operates as the G/O.

The printer 100 comprises the same configuration as that of the printer 10, except that the printer 100 in a MAC address "M100" and does not store the user information 38.

(Configuration of Mobile Terminal 50A)

The mobile terminal 50A is a portable terminal device such as a cell phone, a smartphone, a PDA, a laptop PC, a tablet PC, a portable music player, and a portable movie player. The mobile terminal 50A comprises an operation unit 52, a display unit 54, a Wi-Fi I/F 70, an NFC I/F 72, and a controller 80.

The operation unit 52 includes a plurality of keys. The user can input various instructions to the mobile terminal 50A by operating the operation unit 52. The display unit 54 is a display for displaying various types of information. The display unit 54 also functions as a so-called touch panel (i.e., as an operation unit).

The Wi-Fi 70 is an I/F for executing a wireless communication according to the Wi-Fi scheme. The Wi-Fi I/F 70 does not support the WFD scheme. That is, the mobile terminal 50A is a legacy device which can establish a normal Wi-Fi connection but cannot establish a WFD connection. The NFC I/F 72 is the same as the NFC I/F 22 of the printer 10.

The controller 80 comprises a CPU 82 and a memory 84. The CPU 82 executes various processes according to each of programs 86A, 88A stored in the memory 84. The OS (abbreviation of Operating System) program 86A is a program for controlling various basic operations of the mobile terminal 50A. In the present embodiment, the OS program 86A is an OS of iOS (registered trademark) platform. Further, the iOS print application 88A is an application provided by a vendor of the printer 10 and is installed to the mobile terminal 50A, for example, from a server on the Internet. The print application 88A is an application for establishing a Wi-Fi connection between the mobile terminal 50A and the printer 10 and for executing a communication of target data (e.g., print data, and the like) between the mobile terminal 50A and the printer 10. Hereinafter, the print application may be simply termed "app".

(Configuration of Mobile Terminal 50B)

The mobile terminal 50B comprises almost the same configuration as that of the mobile terminal 50A. However a Wi-Fi of the mobile terminal 50B supports the WFD scheme. That is, the mobile terminal 50B is a WFD device which can establish a normal Wi-Fi connection and a WFD connection. Further, a memory of the mobile terminal 50B stores an OS program 86B and an app 88B, instead of the OS program 86A and the app 88A. In the present embodiment, the OS program 86B is an OS of Android (registered trademark) platform. The Android app 88B provides the mobile terminal 50B with basically the same function as that of the iOS app 88A, however, it differs from the app 88A as described later.

(Case A; FIG. 2)

Next, a case A in which a Wi-Fi connection is established between the printer 10 and the mobile terminal 50A, which is the legacy device, under a situation where an operation state of the printer 10 is the device state will be described with reference to FIG. 2. Hereinafter, for the sake of easier understanding, operations executed by the CPUs 32, 82 and the like of the devices 10, 50 will be described with the devices (i.e., the printer 10, the mobile terminals 50A, 50B) as subjects of action, instead of describing with the CPUs as subjects of action. Further, in FIG. 2 and the subsequent drawings, an NFC communication is represented by a thick-line arrow, and a Wi-Fi communication is represented by a thin-line arrow.

In a case where an operation for enabling a WFD function is performed in the operation unit 12 under a state where the WFD function is disabled (i.e., under a state where the printer 10 is in neither of the G/O state, the CL state, nor the device state), the printer 10 operates in the device state. Upon the shift to the device state, the CPU 32 decides an SSID "X10" and a password "P10" to be used in a WFDNW in which the printer 10 operates as the G/O.

When an operation for activating the app 88A is performed by the user, the mobile terminal 50A activates the app 88A in T100. Due to this, the mobile terminal 50A executes each of following processes according to the app 88A. When the user brings the mobile terminal 50A close to the printer 10 in T102, an NFC connection is established between the NFC I/F 72 of the mobile terminal 50A and the NFC I/F 22 of the printer 10 in T104.

When the NFC connection is established in T104, the printer 10 sends, in T106, the SSID "X10", the password "P10", and the user information 38 to the mobile terminal 50A by using the NFC connection. Then, in T108, the printer 10 shifts to the G/O state from the device state. In this case, the printer 10 stores the wireless information WI1 including the SSID "X10" and the password "P10" in the memory 34.

When receiving a Probe request sent by broadcast from the mobile terminal 50A in T112, the printer 10 sends a Probe response including the SSID "X10" to the mobile terminal 50A in T114.

The mobile terminal 50A already received the SSID "X10" from the printer 10 in T106. Therefore, in a case where the mobile terminal 50A receives a plurality of Probe responses from a plurality of devices including the printer 10 in T114, it can identify the Probe response including the SSID "X10" from the plurality of Probe responses. Then, the mobile terminal 50A executes each of following processes in order to establish a Wi-Fi connection with the printer 10, which is the sender of the identified Probe response.

When receiving the Probe response from the printer 10 in T114, the mobile terminal 50A sends a Probe request including the SSID "X10" (i.e., a unicast Probe request) to the printer 10 in T116.

When receiving the Probe request from the mobile terminal 50A in T116, the printer 10 sends a Probe response including the SSID "X10" to the mobile terminal 50A in T118.

When receiving the Probe response from the printer 10 in T118, the mobile terminal 50A executes a connection process (communications of Authentication, Association, 4-way Handshake, and the like) with the printer 10 in T120. The mobile terminal 50A already received the SSID "X10" and the password "P10" of the WFDNW in which the printer 10 operates as the G/O in T106. Therefore, the mobile terminal 50A executes the connection process including sending of the SSID "X10" and the password "P10" to the printer 10.

The printer 10 receives the SSID "X10" and the password "P10" from the mobile terminal 50A in T120, in course of the execution of the connection process with the mobile terminal 50A. Since an authentication for these information is executed and succeeds, the printer 10 establishes a normal Wi-Fi connection with the mobile terminal 50A and causes the mobile terminal 50A to participate in, as a legacy (i.e., as a child station), the WFDNW in which the printer 10 operates as the G/O, in T122.

When establishing the normal Wi-Fi connection with the printer 10 and participating in, as a legacy, the WFDNW in which the printer 10 operates as the G/O in T122, the mobile terminal 50A sends an HTTP (abbreviation of Hyper That Transfer Protocol) request to the printer 10 in T124. This HTTP request does not include the user information 38.

When receiving the HTTP request from the mobile terminal 50A in T124, the printer 10 sends an HTTP response including information "unauthorized" to the mobile terminal 50A in T126. The information "unauthorized" is information indicating that an authentication for the user information 38 is not successful. That is, since the printer 10 receives the HTTP request that does not include the user information 38 in T124, the printer 10 notifies the mobile terminal 50A that the authentication for the user information 38 is not successful.

The mobile terminal 50A already received the user information 38 from the printer 10 in T106. Therefore, the mobile terminal 50A sends an HTTP request including the received user information 38 to the printer 10 in T128.

When receiving the HTTP request including the user information 38 in T128, the printer 10 executes an authentication for the user information 38 in T129. In a case where the user information 38 included in the HTTP request is identical to the user information 38 in the memory 34, the printer 10 determines that the authentication for the user information 38 is successful (YES in T129), and sends an HTTP response including information "OK" to the mobile terminal 50A in T130. The information "OK" is information indicating that the authentication for the user information 38 is successful.

When receiving the HTTP response including the information "OK" in T130, the mobile terminal 50A sends an HTTP request including a long time G/O command to the printer 10 in T132. The long time G/O command is a command for instructing the printer 10 to use, as a preservation time of the printer 10, a second preservation time from among a first preservation time and the second preservation time which is longer than the first preservation time. The preservation time is a time for preserving the state of the printer 10 in the G/O state under a situation where there is no child station device operating as a child station of the WFDNW after the Wi-Fi connection (see T122) established between the printer 10 and the mobile terminal 50A has been disconnected. Specifically, the mobile terminal 50A sends the HTTP request including the long time G/O command to the printer 10, for example, by a POST method or a PUT method of the HTTP. Thereafter, the mobile terminal 50A proceeds to a process of T134.

On the other hand, in a case where the user information included in the HTTP request is not identical to the user information 38 in the memory 34, the printer 10 determines that the authentication for the user information 38 is failed (NO in T129), and proceeds to the process of T134 without executing T130 and T132. For example, there is a possibility that T102 to T106 are executed under a situation where the mobile terminal 50A does not comprise the app 88A (i.e., without executing T100). In this case, the mobile terminal 50A cannot interpret the uses information 38 received in T106, as a result of which the mobile terminal 50A does not send the HTTP request including the user information 38 to the printer 10 even in the case of receiving the HTTP response in T126. In such a situation, the authentication for the user information 38 is failed.

The printer 10 receives print data from the mobile terminal 50A in T134. Then, in T 136, the printer 10 supplies the received print data to the print executing unit 16 and prints an image represented by the print data onto a print medium.

(Case B; FIG. 3)

Next, a case B in which a Wi-Fi connection is established between the printer 10 and the mobile terminal 50B, which is the WFD device, under the situation where the operation state of the printer 10 is in the device state will be described with reference to FIG. 3.

T200 to T214 are the same as T100 to T114 of FIG. 2, except that the communication target is the mobile terminal 50B instead of the mobile terminal 50A. Since the mobile terminal 50B is the WFD device, T216 and its subsequent processes are executed according to the WFD scheme.

Specifically, in response to receiving a Provision discovery request from the mobile terminal 50B in T216, the printer 10 sends a Provision discovery response to the mobile terminal 50B in T218. The Provision discovery request and the response thereto are communications unique to the WFD scheme. Then, in response to receiving a Probe request including the SSID "X10" from the mobile terminal 50B in T220, the printer 10 sends a Probe response including the SSID "X10" to the mobile terminal 50B in T222.

Next, the printer 10 executes a connection process with the mobile terminal 50B in T224. This connection process includes WSC Exchange, unlike the connection process of T120 in FIG. 2. In the WSC Exchange, the SSID "X10" and the password "P10" are sent from the printer 10 to the mobile terminal 50B. Then, the printer 10 receives the SSID "X10" and the password "P10" from the mobile terminal 50B and executes an authentication for these information, as a result of which the authentication succeeds. As such, in the case B, the password "P10" is sent to the mobile terminal 50B in the WSC Exchange and thus the password "P10" is not necessarily sent to the mobile terminal 50B in the NFC communication of T206. However, as in the case A of FIG. 2, the WSC Exchange is not executed in the connection process with the mobile terminal 50A being the legacy device, and thus the password "P10" is not sent from the printer 10 to the mobile terminal 50A. Therefore, in the present embodiment, the printer 10 sends the password "P10" to the mobile terminals 50A and 50B inure NFC communication (T106 of FIG. 2, T206 of FIG. 3) such that the printer 10 can establish the Wi-Fi connection with the mobile terminal 50A being the legacy device. In T226, the printer 10 establishes a WFD connection with the mobile terminal 50B and causes the mobile terminal 50B to participate in, as CL (i.e., as a child station), the WFDNW in which the printer 10 operates as the G/O.

Even when establishing the WFD connection with the printer 10 and participating in, as a CL, the WFDNW in which the printer 10 operates as the G/O in T226, the mobile terminal 50B does not send an HTTP request (see T124 of FIG. 2) to the printer 10. As such, the Android app 88B is configured not to send an HTTP request after the establishment of the Wi-Fi connection with the printer 10. T232 and T234 to be executed thereafter are the same as T134 and T136 of FIG. 2.

(Continuation of Case A and Case B; FIG. 4)

Next, a process executed by the devices 10, 50 after the printer 10 has executed the print process (i.e., after the case A of FIG. 2 and the case B of FIG. 3) will be described with reference to FIG. 4. In the present embodiment, the printer 10 determines one of a first preservation time (i.e., 300 seconds) and a second preservation time (i.e., 24 hours) after the Wi-Fi connection between the mobile terminal 50 (which is 50A in the case A of FIG. 2, 50B in the case B of FIG. 3) and the printer 10 has been disconnected.

The printer 10 disconnects the Wi-Fi connection with the mobile terminal 50 in T300. For example, the Wi-Fi connection is disconnected when the mobile terminal 50 is brought to a position away from the printer 10 such that a distance between the printer 10 and the mobile terminal 50 reaches a distance with which a Wi-Fi communication therebetween cannot be executed. In this case, a number of child devices participating in the WFDNW formed by the printer 10 becomes zero.

When the number of child devices participating in the WFDNW becomes zero, the printer 10 determines, in T302, whether or not the long time G/O command has been received from the mobile terminal 50. In a case where the process of FIG. 4 is executed after the case A of FIG. 2, the printer 10 already received the long time G/O command from the mobile terminal 50A in T132, of FIG. 2. Thus, in this case, the printer 10 determines YES in T302, and determines the second preservation time (i.e., 24 hours) as its preservation time in T304.

When establishing the normal Wi-Fi connection with the printer 10 in T122 of FIG. 2, the mobile terminal 50A stores the SSID "X10" and the password "P10". After that under a situation where the mobile terminal 50A is not establishing a normal Wi-Fi connection with any devices, the mobile terminal 50A periodically sends a Probe request by broadcast to search for a parent station around the mobile terminal 50A. Therefore, when the mobile terminal 50A is brought dose to the printer 10 while the printer 10 is preserved in the G/O state, the mobile terminal 50A receives a Probe response including the SSID "X10" from the printer 10 in T308 in response to sending a Probe request by broadcast in T306.

When receiving the Probe response from the printer 10 in T308, the mobile terminal 50A determines that the SSID "X10" included in that Probe response is identical to the stored SSID "X10" and attempts to establish a normal Wi-Fi connection with the printer 10 which is the sender of that Probe response. That is, in response to sending a Probe request including the SSID "X10" in T310, the mobile terminal 50A receives a Probe response including the SSID "X10" from the printer 10 in T312. Then, in T314, the mobile terminal 50A executes the connection process (communications of Authentication, Association, 4-way Handshake, and the like, same as T120 of FIG. 2) by using the stored SSID "X10" and password "P10". As a result, in T316, the mobile terminal 50A re-establishes the normal Wi-Fi connection with the printer 10 and participates in again, as a legacy, the WFDNW in which the printer 10 operates as the G/O.

When re-establishing the normal Wi-Fi connection with the mobile terminal 50A and causing the mobile terminal 50A to participate in the WFDNW as a legacy in T316, the printer 10 stops a count for the preservation time. Then, when the normal connection with the mobile terminal 50A is disconnected again, the printer 10 determines YES again in T302 and determines the second preservation time (i.e., 24 hours) again as the preservation time in T304.

On the other hand, in a case where the process of FIG. 4 is executed after the case B of FIG. 3, the printer 10 has not received the long time G/O command from the mobile terminal 50B in the process of FIG. 3. Thus, the printer 10 determines NO in T302 and determines the first preservation time (i.e., 300 seconds) as its preservation time in T320. Then, in a case where the first preservation time (i.e., 300 seconds) has elapsed under a situation where there is no child device participating in the WFDNW, the printer 10 shifts to the device state from the G/O state in T322.

The mobile terminal 50B stores the SSID "X10" and the password "P10" when establishing the WFD connection with the printer 10 in T226 of FIG. 3. Further, the mobile al terminal 50B stores the MAC address "M10" of the printer 10 included in each signal (e.g., the Probe response of T214, etc.) received from the printer 10. Especially, the mobile terminal 50B being the WFD device supports a Persistent function employed in the WFD scheme, and stores the SSID "X10", the password "P10", and the MAC address "M10" as Persistent information. The Persistent function is a function for re-establishing a WFD connection under a situation Where neither of a G/O nor a CL is present (i.e., under a situation where each of a pair of devices is in the device state) after a WFD connection between the G/O and the CL has been disconnected. Under a situation where the mobile terminal 50B is not establishing a WFD connection with any devices, the mobile terminal 50B periodically sends a Probe request by broadcast to search for a WFD device with which the mobile terminal 50B established a WFD connection in the past. Thus, when the mobile terminal 50B is brought close to the printer 10 after the printer 10 has shifted to the device state, the mobile terminal 50B receives a Probe response including the MAC address "M10" from the printer 10 in T328 in response to sending a Probe request by broadcast in T326. At this stage, the printer 10 is not in the G/O state (i.e. the printer 10 is in the device state), and thus that Probe response does not include the SSID "X10" of the WFDNW.

When receiving the Probe response including the MAC address "M10" from the printer 10 in T328, the mobile terminal 50B determines that the MAC address "M10" included in that Probe response is identical to the MAC address "M10" included in the stored Persistent information, and attempts to re-establish the WFD connection with the printer 10 which is the sender of that Probe response. That is, in response to sending a Probe request including the MAC address "M10" in T340, the mobile terminal 50B receives a Probe response including the MAC address "M10" from the printer 10 in T342.

When executing the communications of the Probe request and the Probe response including the MAC address "M10" in T340 and T342, the printer 10 ends an Invitation request to the mobile terminal 50B in T350. The Invitation request is a command unique to the WFD scheme, and is a command for requesting a participation in the WFDNW which the printer 10 operates as the G/O. Then, the printer 10 receives an invitation response including information "OK" from the mobile terminal 50B in T352.

When receiving the Invitation response from the mobile terminal 50B in T352, the printer 10 shifts to the G/O state from the device state in T360. After that, by executing the same processes as T216 to T224 of FIG. 3, the printer 10 re-establishes the WFD connection with the mobile terminal 50B and causes the mobile terminal 50B to participate in again, as a CL, the WFDNW in which the printer 10 operates as the G/O in T370.

(Case C (Comparative Example); FIG. 5)

Next, as a comparative example, a case C in which a Wi-Fi connection is established between the printer 100, which is different from the printer 10, and the mobile terminal 50A being the legacy device will be described. The printer 100 decides an SSID "X100" and a password "P100" to be used in a WFDNW in which the printer 100 operates as the G/O when shifting to the device state.

T400 to T426 are the same as T100 to T126 of FIG. 2, except that the communication target is the printer 100 instead of the printer 10 and that the SSID "X100" and the password "P100" are used. However, since the printer 100 does not store user information (see the user information 38 of the printer 10 in FIG. 1), the printer 100 does not send user information to the mobile terminal 50A.

The mobile terminal 50A does not receive the user information 38 in T406, and thus it does not send an HTTP request including the user information to the printer 100 even when receiving the HTTP response in T426. Due to this, unlike the case A, the mobile terminal 50A does not send the long time G/O command to the printer 100. Subsequently executed T434 and T436 are the same as T134 and T136 of FIG. 2.

After that, the printer 100 disconnects the connection with the mobile terminal 50A in T500. In this case, the number of child devices participating in the WFDNW formed by the printer 100 becomes zero.

As aforementioned, in the present case C, the printer 100 does not receive the long time G/O command from the mobile terminal 50A, and thus when the number of child devices participating in the WFDNW becomes zero, the printer 100 determines the first preservation time (i.e., 300 seconds) as its preservation time in T520. Then, in a case where the first preservation time (i.e., 300 seconds) has elapsed under the situation where there is no child device participating in the WFDNW, the printer 100 shifts to the device state from the G/O state in T522.

Thereafter, the mobile terminal 50A periodically sends a Probe request by broadcast to search for a parent station around the mobile terminal 50A. Thus, in response to sending a Probe request by broadcast T526, the mobile terminal 50A receives a Probe response from the printer 100 in T528. Since the printer 100 is operating in the device state, this Probe response does not include the SSID "X100" but includes the MAC address "M100".

The mobile terminal 50A stores the SSID "X100" and the password "P100" when establishing the normal Wi-Fi connection with the printer 100 in T422. However, since the Probe response received in T528 does not include SSID identical to the stored SSID "X100", the mobile terminal 50A cannot execute the processes for establishing the normal Wi-Fi connection with the printer 100 which is the sender of the Probe response (the processes of T416 to T422). Further, since the mobile terminal 50A is the legacy device which does not support the WFD scheme, it cannot execute the processes of T340 to T352 of FIG. 4, either. As such, in the present case C, the mobile terminal 50A has to re-establish the NFC connection with the printer 100 and execute the same processes as T402 to T422 in order to re-establish the Wi-Fi connection with the printer 100 after it has been disconnected.

(Effect of the Present Embodiment)

Contrary to the above, as shown in the case A of FIG. 2, in the case where the normal Wi-Fi connection with the primer 10 is established (T122 of FIG. 2), the mobile terminal 50A sends the long time G/O command to the printer 10 (T132). Due to this, the printer 10 determines the second preservation time (i.e., 24 hours), which is longer than the first preservation time (i.e., 300 seconds), as its preservation time (T304 of FIG. 4). Therefore, even if the Wi-Fi connection between the printer 10 and the mobile terminal 50A is disconnected, the printer 10 is preserved in the G/O state for a relatively long period of time. Due to this, the mobile terminal 50A can automatically re-establish the normal connection with the printer 10 (T306 to T316 of FIG. 4), without an NFC connection being established by the user bringing the mobile terminal 50A close to the printer 10. Therefore, user's convenience is improved.

On the other hand, in the case B of FIG. 3, in the case where the Wi-Fi connection established with the printer 10 (T226 of FIG. 3), the mobile terminal 50B does not send the long time G/O command to the printer 10. Due to this, the printer 10 determines the first preservation time, which is shorter than the second preservation time, as its preservation time (T320 of FIG. 4). Therefore, the printer 10 promptly shifts to the device state from the G/O state (T322) after the Wi-Fi connection between the printer 10 and the mobile terminal 50B has been disconnected. Due to this, processing load on the printer 10 can be reduced. Even when the printer 10 shifts to the device state, the user's convenience is not deteriorated because the mobile terminal 50B supports the Persistent function. That is, without an NFC connection being established by the user bringing the mobile terminal 50B close to the printer 10, the mobile terminal 50B can cause the printer 10 to shift from the device state to the G/O state and automatically re-establish the Wi-Fi connection with the printer 10 (T326 to T370).

As aforementioned, the printer 10 can determine different preservation times depending on whether a connection target device is the mobile terminal 50A being the legacy device or is the mobile terminal 50B being the WFD device, and can execute appropriate operations according to the device type.

Further, in the case where the long time G/O command is not received, the printer 10 determines a value larger than zero (which is 300 seconds, in the present embodiment) as the first preservation time (T320 of FIG. 4). Due to this, the printer 10 is preserved in the G/O state even if the Wi-Fi connection between the printer 10 and the mobile terminal 50B is disconnected unintentionally, for example, due to an unstable communication state between the printer 10 and the mobile terminal 50B, and the like. Therefore, the mobile terminal 50B can promptly re-establish the Wi-Fi connection with the printer 10. Specifically, the mobile terminal 50B can re-establish the Wi-Fi connection with the printer 10 simply by executing the processes of T326 to T342 of FIG. 4 and the process of T224 of FIG. 3. Therefore, there is no need to execute the processes of T350 to T360, and thus the Wi-Fi connection can be promptly re-established.

Further, the printer 10 sends the user information 38 to the mobile terminal 50A by using the NFC connection (T106 of FIG. 2). Due to this, the printer 10 can receive the HTTP request including the user information 38 (T128) without the user of the mobile terminal 50A performing an input of the user information. Thus, the user's convenience is improved. Further, in the case where the authentication for the user information 38 is successful, the printer 10 receives the long time G/O command from the mobile terminal 50A (T132) and determines the second preservation time as the preservation time. In other words, even if an HTTP request not including the user information 38 is received from a mobile terminal which does not comprise the iOS app 88A, the authentication for the user information 38 is failed, and thus the printer 10 does not accept that HTTP request from that mobile terminal. Due to this, if the long time G/O command sent from that mobile terminal for which the authentication is failed is received, the printer 10 does not determine the second preservation time according to the long time G/O command. The printer 10 can be preserved in the G/O state for a long period of time according to only an instruction from the mobile terminal 50A comprising the iOS app 88A.

(Correspondence Relationships)

The printer 10, the NFC 22, and the Wi-Fi I/F 20 are examples of "communication device", "first wireless interface (of the communication device)", and "second wireless interface (of the communication device)", respectively. The NFC connection and the connection are examples of "first wireless connection" and "second wireless connection", respectively. The mobile terminal 50A and the mobile terminal 50B are examples of "first type external device" and "second type external device", respectively. The long time G/O command is an example of "predetermined signal", 300 seconds and 24 hours are examples of "first preservation time" and "second preservation time", respectively. The G/O state and the device state are examples of "parent state" and "specific state", respectively. The user information 38 sent by using the NFC connection of T106 of FIG. 2 and the HTTP request including the user information 38 of T128 are examples of "authentication information". The HTTP response including the information "OK" of T130 of FIG. 2 is an example of "success information". The user information 38 sent by using the NFC connection of T106 of FIG. 2 is an example of "specific information". The NFC I/F 72 and the Wi-Fi I/F 70 are examples of "first wireless interface (of a terminal device)" and "second wireless interface (of the terminal device)", respectively.

T122 of FIG. 2 and T226 of FIG. 3 are examples of a process executed by "(causing the communication device to) establish a second wireless connection". T302 of FIG. 4 is an example of a process executed by "determine whether a predetermined signal is received". T304 and T320 of FIG. 4 are examples of a process executed by "determine a preservation time". T322 of FIG. 4 is an example of a process executed by "shift the state of the communication device from the parent station state to a specific state". T122 of FIG. 2 is an example of a process executed by "(causing the terminal device to) establish a second wireless connection". T132 of FIG. 2 is an example of a process executed by "send a predetermined signal".

(Variant 1) The mobile terminal 50B may send an HTTP request, instead of the mobile terminal 50A. That is, the app 88A may be configured not to send an HTTP request, and the app 88B may be configured to send an HTTP request. In this case, the printer 10 may determine the first preservation time (i.e., 300 seconds) in a case where the long rime G/O command is received from the mobile terminal 50B (i.e., WFD device) comprising the app 88B, and may determine the second preservation time (i.e., 24 hours) in a case where the long time G/O command is not received from the mobile terminal 50A (i.e., legacy device) comprising the app 88A. That is, "one of a first preservation time and a second preservation lime" and "the other of the first preservation time and the second preservation time" may respectively be "the second preservation time" and "the first preservation time" as in the embodiment, or may respectively be "the first preservation time" and "the second preservation time" as in the present variant.

(Variant 2) The printer 10 may not send the user information 38 in T106 of FIG. 2. In this case, the printer may not execute T126 to T132 after receiving the HTTP request in T124. Then, instead of T302 of FIG. 4, the printer 10 determines whether the HTTP request has been received or not. The printer 10 determines the second preservation time in a case where it is determined that the HTTP request has been received, and determines the first preservation time in a case where it is determined that the HTTP request has not been received. In the present variant, the HTTP request is an example of "predetermined signal".

(Variant 3) The mobile terminal 50A may send the long time G/O command to the printer 10 by using the NFC connection established in T104 of FIG. 2. In other words, the printer 10 may receive the long time G/O command flour the mobile terminal 50A by using the NFC connection. That is, "predetermined signal" may be received by using the second wireless connection as in the embodiment, or may be received by using the first wireless connection as in the present variant. Further, in the present variant, T124 to T132 may be omitted. That is, "receive authentication information" and "send success information" may be omitted.

(Variant 4) The printer 10 may not send the user information 38 in T106 of FIG. 2. In this case, the mobile terminal 50A may display a screen for inputting the user information 38 in the case of receiving the HTTP response in T126, and may send an HTTP request including the inputted user information to the printer 10 in T128. That is, "first wireless interface" may not send the authentication information to the external device.

(Variant 5) The printer 10 may receive the long time G/O command from the mobile terminal 50A in T132 by using a communication according to SNMP (abbreviation of Simple Network Management Protocol), instead of using the HTTP request. That is, "predetermined signal" is not limited to a signal according to the HTTP.

(Variant 6) The mobile terminal 50A may be a WFD device supporting the WFD scheme. In this case, each of the mobile terminal 50A and the mobile terminal 50B can automatically re-establish the Wi-Fi connection with printer 10 without establishing the NFC connection with printer 10, but the mobile terminal 50A sends the long time G/O command to the printer 10. Due to this, in the case where the Wi-Fi connection between the mobile terminal 50A and the printer 10 is disconnected, the printer 10 determines the second preservation time (i.e., 24 hours) as the preservation time. In such a configuration, the printer 10 is preserved in the G/O state for a relatively long period of time, and thus a time required for the printer 10 to shift from the device state to the G/O state upon re-establishing the Wi-Fi connection with the mobile terminal 50A can be reduced. Therefore, convenience for a user who frequently uses the printer 10 is improved. In the present variant, each of "first type external device" and "second type external device" is "a device that is capable of re-establishing the second wireless connection with the communication device without re-establishing the first wireless connection with the communication device after the state of the communication device has shifted from the parent station state to the specific state".

(Variant 7) "Communication device" is not limited to the printer 10, and may be a scanner, an MFP, a PC, a server, a mobile terminal, or the like.

(Variant 8) "First wireless interface (of the communication device)" and "first wireless interface (of the terminal device)" may not be the I/Fs for executing an NFC communication, and may be I/Fs for executing a wireless communication according to other communication scheme, such as BlueTooth (registered trademark), infrared, Transfer Jet, and the like.

What is claimed is:
1. A communication device comprising:
a first wireless interface;
a second wireless interface, a maximum distance with which a wireless communication via the second wireless interface can be executed being larger than a maximum distance with which a wireless communication via the first wireless interface can be executed;
a processor; and
a memory storing computer-readable instructions therein, the computer-readable instructions, when executed by the processor, causing the communication device to:
in a case where a first wireless connection via the first wireless interface is established with an external device, establish a second wireless connection via the second wireless interface with the external device so as to cause the external device to participate in, as a child station, a wireless network in which the communication device operates as a parent station;
determine whether a predetermined signal is received from the external device, in a case where the second wireless connection is established with the external device, wherein in a case where the external device is a first type external device, the predetermined signal is received from the first type external device, and in a case where the external device is a second type external device different from the first type external device, the predetermined signal is not received from the second type external device;

determine a preservation time according to the determination whether the predetermined signal is received, the preservation time being a time for preserving a state of the communication device in a parent station state under a situation where there is no child station device operating as a child station of the wireless network after the second wireless connection with the external device has been disconnected, the parent station state being a state where the communication device operates as the parent station of the wireless network; and in a case where the determined preservation time has elapsed without a child station device participating in the wireless network, shift the state of the communication device from the parent station state to a specific state where the communication device does not operate as a parent station or a child station of a wireless network, wherein one of a first preservation time and a second preservation time which is longer than the first preservation time is determined as the preservation time, in a case where it is determined that the predetermined signal is received from the external device, and the other of the first preservation time and the second preservation time is determined as the preservation time, in a case where it is determined that the predetermined signal is not received from the external device wherein the second type external device is capable of re-establishing the second wireless connection with the communication device without re-establishing the first wireless connection with the communication device after the state of the communication device has shifted from the parent station state to the specific state, wherein the first type external device is incapable of re-establishing the second wireless connection with the communication device unless the first wireless connection is re-established with the communication device after the state of the communication device has shifted from the parent station state to the specific state, and wherein the one of the first preservation time and the second preservation time is the second preservation time, and the other of the first preservation time and the second preservation time is the first preservation time.

2. The communication device as in claim 1, wherein the computer-readable instructions, when executed by the processor, further cause the communication device to:

in the case where the external device is the first type external device, receive the predetermined signal from the first type external device via the second wireless interface by using the second wireless connection.

3. The communication device as in claim 2, wherein the computer-readable instructions, when executed by the processor, further cause the communication device to:

in the case where the external device is the first type external device, receive authentication information from the first type external device via the second wireless interface by using the second wireless connection; and in a case where an authentication using the authentication information is successful, send success information to the first type external device via the second wireless interface by using the second wireless connection, the success information indicating that the authentication is successful, and wherein the predetermined signal is received from the first type external device in response to sending the success information to the first type external device.

4. The communication device as in claim 3, wherein the first wireless interface sends the authentication information to the external device by using the first wireless connection.

5. The communication device as in claim 2, wherein the predetermined signal is a signal according to HTTP (abbreviation of Hyper Text Transfer Protocol).

6. The communication device as in claim 2, wherein the first wireless interface sends specific information to the external device by using the first wireless connection, the specific information indicating that it is capable of determining either one of the first preservation time and the second preservation time as the preservation time of the communication device, and in the case where the external device is the first type external device, the predetermined signal is received from the first type external device in response to sending the specific information to the first type external device.

7. The communication device as in claim 6, wherein the specific information includes authentication information, the computer-readable instructions, when executed by the processor, further cause the communication device to:
receive the authentication information from the first type external device via the second wireless interface by using the second wireless connection; and in a case where an authentication using the authentication information is successful, send success information to the first type external device via the second wireless interface by using the second wireless connection, the success information indicating that the authentication is successful, and the predetermined signal is received from the first type external device in response to sending the success information to the first type external device.

8. The communication device as in claim 1, wherein the first preservation time is equal to 0 or longer.

9. A non-transitory computer-readable recording medium storing computer-readable instructions for a terminal device, wherein the computer-readable instructions, when executed by a processor of the terminal device, cause the terminal device to:

in a case where a first wireless connection via a first wireless interface of the terminal device is established with a communication device, establish a second wireless connection via a second wireless interface of the terminal device with the communication device so as to participate in, as a child station, a wireless network in which the communication device operates as a parent station, a maximum distance with which a wireless communication via the second wireless interface can be executed being larger than a maximum distance with which a wireless communication via the first wireless interface can be executed; and in a case where the second wireless connection is established with the communication device, send a predetermined signal to the communication device via the second wireless interface by using the second wireless connection, wherein the predetermined signal is a signal for instructing the communication device to use, as a preservation time of the communication device, a second preservation time from among a first preservation time and the second preservation time which is longer than the first preservation time, wherein the preservation time is a time for preserving a state of the communication device in a parent station state under a situation where there is no child station device operating as a child station of the wireless network after the second wireless connection with the terminal device has been disconnected, the parent station state being a state where the communication device operates as the parent station of the wireless network, and wherein the terminal device is incapable of re-establishing the second wireless connection with the communication device unless the first wireless connection is re-established with the communication device after the state of the communication device has shifted from the parent station state to a specific state where the communication device does not operate as a parent station or a child station of a wireless network.

10. A computer-readable storage medium storing instructions that, when executed by a processor of a communication device, cause the communication device to:

in a case where a first wireless connection via a first wireless interface is established with an external device, establishing a second wireless connection via a second wireless interface with the external device so as to cause the external device to participate in, as a child station, a wireless network in which the communication device operates as a parent station, a maximum distance with which a wireless communication via the second wireless interface can be executed being larger than a maximum distance with which a wireless communication via the first wireless interface can be executed;

determining whether a predetermined signal is received from the external device, in a case where the second wireless connection is established with the external device, wherein in a case where the external device is a first type external device, the predetermined signal is received from the first type external device, and in a case where the external device is a second type external device different from the first type external device, the predetermined signal is not received from the second type external device;

determining a preservation time according to the determination whether the predetermined signal is received, the preservation time being a time for preserving a state of the communication device in a parent station state under a situation where there is no child station device operating as a child station of the wireless network after the second wireless connection with the external device has been disconnected, the parent station state being a state where the communication device operates as the parent station of the wireless network; and in a case where the determined preservation time has elapsed without a child station device participating in the wireless network, shifting the state of the communication device from the parent station state to a specific state where the communication device does not operate as a parent station or a child station of a wireless network, wherein the determining the preservation time includes:
one of a first preservation time and a second preservation time which is longer than the first preservation time being determined as the preservation time, in a case where it is determined that the predetermined signal is received from the external device, and the other of the first preservation time and the second preservation time being determined as the preservation time, in a case where it is determined that the predetermined signal is not received from the external device, wherein the second type external device is capable of re-establishing the second wireless connection with the communication device without re-establishing the first wireless connection with the communication device after the state of the communication device has shifted from the parent station state to the specific state, wherein the first type external device is incapable of re-establishing the second wireless connection with the communication device unless the first wireless connection is re-established with the communication device after the state of the communication device has shifted from the parent station state to the specific state, and wherein the one of the first preservation time and the second preservation time is the second preservation time, and the other of the first preservation time and the second preservation time is the first preservation time.

11. The computer-readable storage medium of claim 10, wherein the instructions, when executed by the processor, further cause the communication device to:

in the case where the external device is the first type external device, receive the predetermined signal from the first type external device via the second wireless interface by using the second wireless connection.

* * * * *